Oct. 18, 1932.    J. A. SPENCER ET AL    1,883,251
THERMOSTAT
Filed April 11, 1931    2 Sheets-Sheet 1
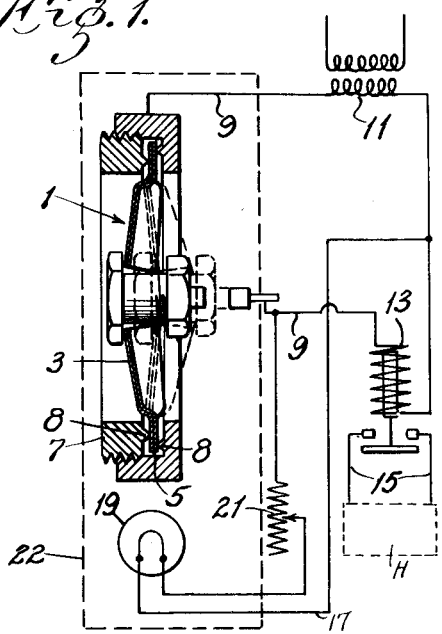
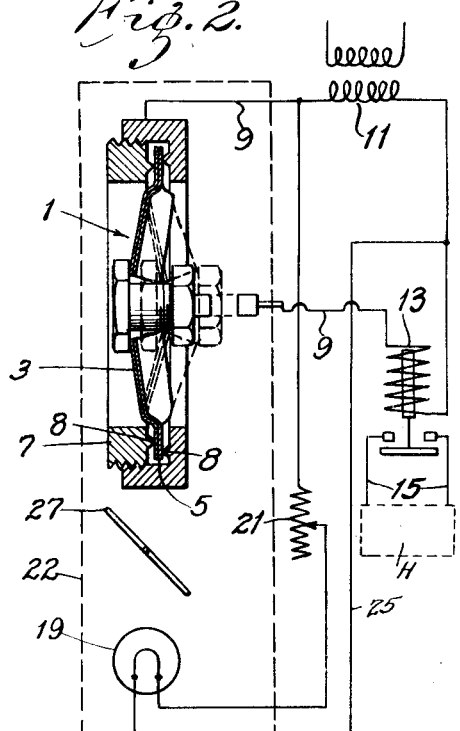
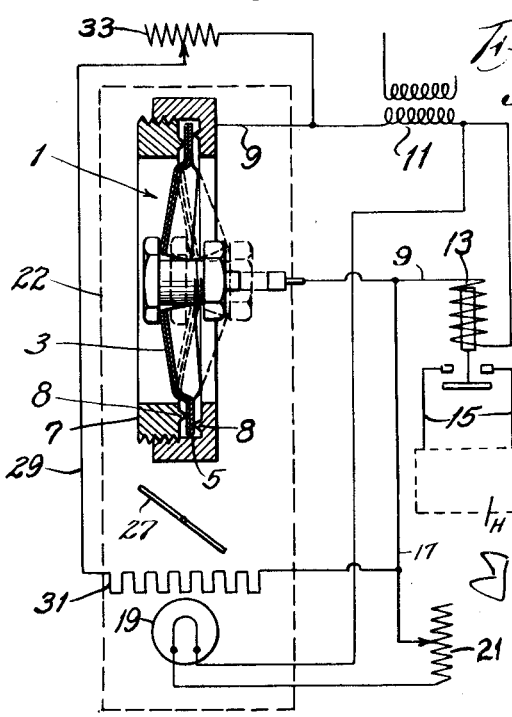
John A. Spencer,
Vannevar Bush,
Delos F. Haynes,
Inventors.
Attorney.

Oct. 18, 1932.    J. A. SPENCER ET AL    1,883,251
THERMOSTAT
Filed April 11, 1931    2 Sheets-Sheet 2

Patented Oct. 18, 1932

1,883,251

UNITED STATES PATENT OFFICE

JOHN A. SPENCER, OF NEWTONVILLE, AND VANNEVAR BUSH, OF BELMONT, MASSACHUSETTS, ASSIGNORS TO GENERAL PLATE COMPANY, OF ATTLEBORO, MASSACHUSETTS, A CORPORATION OF MASSACHUSETTS

THERMOSTAT

Application filed April 11, 1931. Serial No. 529,426.

This invention relates to thermostatic controls, and with regard to certain more specific features to controls of this class in which effective use for close control is made of a snap-acting thermostatic element.

Among the several objects of the invention may be noted the provision of a thermostatic control adapted to control a relatively narrow temperature differential with a powerful thermostat whose operating differential is inherently relatively wide; the provision of a thermostatic control of the class described in which the controlled temperature differential can be varied and/or the temperature range can be varied, without corresponding variations in the action of said thermostat per se. Other objects will be in part obvious and in part pointed out hereinafter.

The invention accordingly comprises the elements and combinations of elements, features of construction, and arrangements of parts which will be exemplified in the structure hereinafter described, and the scope of the application of which will be indicated in the following claims.

In the accompanying drawings, in which are illustrated several of various possible embodiments of the invention, Fig. 1 is a diagram showing one form of the invention;

Fig. 2 is a diagram showing another form;

Fig. 3 is a diagram showing a third form;

Fig. 6 is a front elevation of a time control mechanism; and,

Fig. 7 is a top plan view of the mechanism of Fig. 6, parts being broken away for clarity.

Similar reference characters indicate corresponding parts throughout the several views of the drawings.

Figure 4:
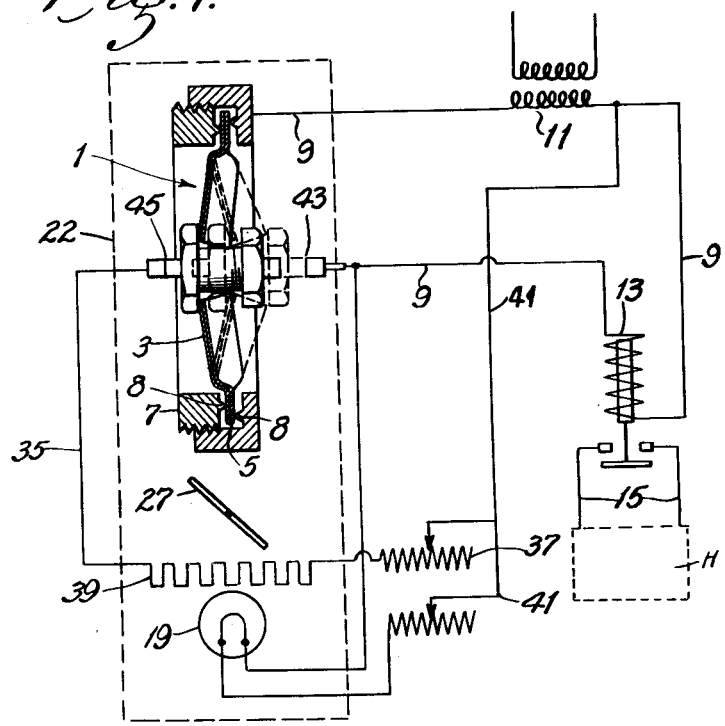
Fig. 4 is a diagram showing a fourth form.

Referring now more particularly to Fig. 1, there is illustrated at numeral 1 a radially corrugated, snap-acting, disc thermostatic element composed of composite material and described more particularly in the now pending United States patent application of John A. Spencer, Serial Number 463,961, filed June 26, 1930, for thermostat. Further improvement in this disc thermostat, to be referred to hereinafter, are set forth in United States patent applications of John A. Spencer, Serial Number 516,042, filed February 16, 1931, for thermostat, and Serial Number 480,153, filed September 6, 1930, for thermostat.

For the purpose of the present specification, it may be noted that the thermostat 1 comprises a composite disc which is radially corrugated and offset as shown at numeral 3 and which has a flat constrictive periphery 5. The metal of the thermostat is the so-called composite metal and in the present example comprises composite materials having different coefficients of thermal expansion, such as brass and steel, so that upon heating, the disc goes through an incipient degree of deformation and thereafter proceeds with a snap-action to take up an opposite position. Upon cooling the process is reversed. Clamping screw means 7 and ridges 8 are used for providing an adjustable initial set in the material of the said thermostat element for causing it to effect a change of position over a regulable temperature differential and range. The adjusting feature is more particularized in said application, Serial No. 516,042. Another adjusting means is shown in said application, Serial No. 480,153.

The snap-acting, thermostatic element 1 is placed in and forms a part of a circuit 9, said circuit 9 being energized from a suitable transformer 11, such as a household transformer. The circuit 9 includes therein a relay 13. The relay 13, when energized, closes a circuit 15 which causes operation of a suitable heater H, such as an oil burner, the purpose of which is to heat said region in which said thermostat 1 is operable. The temperature of the region in which the thermostat is located is that which is to be regulated. Thus when the region or room in which the element 1 is placed becomes too cool, the thermostat element 1 passes to its dotted line, closed position (Fig. 1), thus energizing the circuit 9 and the relay 13, whereupon the circuit 15 is closed so that the oil burner or the like H connected therewith starts to operate an associated heater, thus causing said region or room to rise in temperature. After the temperature rises to the point at which the element 1 is set to snap to the opposite, open, solid-line position, said circuit 9 is opened and the heater H in the circuit 15 consequently shut off.

From the above it will be clear that the temperature differential which exists between hot and cold conditions in the region or room surrounding the element 1 will ordinarily be of the order of the differential required to operate the element 1, unless special provision is made for other operation. Further, not only will the temperature differential be of the differential required to operate the element 1, but also the temperature range, i. e., the actual temperature limits must be the same as the temperatures at which the thermostatic element operates. The herein described invention accomplishes a reduction in the controlled room temperature differential without the use of a snap-acting element having an equally narrow operating differential, and the invention also accomplishes a varying of the temperature range without requiring the use of a snap-acting element having a variable temperature range. It is to be noted that while a thermostatic element may be obtained with a narrow operating differential, such an element is not satisfactory because the power with which the thermostat acts becomes less with a reduction in said differential. Moreover it is difficult to obtain a thermostatic element which has a temperature differential with a variable range. Thus it is of advantage to have a thermostatic element which has a substantial operating differential, a powerful and positive operation being desirable. The present invention provides this and provides for a relatively narrow temperature differential, which is variable, and/or provides a variable differential which may be shifted over a considerable range of temperatures. Thus both the top and bottom temperatures of a temperature differential are variable both with reference to their distance apart and with reference to a given temperature.

The above ends are acomplished by connecting across the transformer 11 and element 1 of circuit 9 a circuit 17, said circuit 17 including in series a signal and heating lamp 19 and an adjustable resistance 21. The lamp 19 is placed in proximity to the thermostatic element 1 preferably directly below the same and in an enclosure such as indicated by the dotted lines 22. However, the enclosure is not absolutely necessary. Thus the lamp 19 is permitted to direct its heat (both convective and/or radiating heat) to the element 1.

Thus the thermostatic element 1 may be set for closing at the minimum temperature which it is desired that the room have. Thus, for instance when the room cools to 68 degrees, the element 1 may snap to close the circuit 9. This energizes the circuit 9, relay 13 and circuit 15 so that the heater H, or the like in connection with said circuit 15, operates. The lamp 19 is also lighted, and not only provides a signal showing that the heater is on, but also applies heat to the element 1. This application of heat is at a rate faster than that which would be supplied by the normal heating of the room. Moreover, the rise in room temperature, as well as the rise in temperature effected by the lamp 19, has a controlling effect on the thermostatic element 1, for the heating capacity of the lamp 19 is so chosen that were it to operate by itself it could not bring the element 1 up to a high enough temperature to snap to an open position. Neither would the desired room temperature alone accomplish this result. However, the two of them together will accomplish the desired temperature rise. For instance, the lamp heat may be responsible for eighteen degrees in temperature rise in the thermostat element 1, and the room heat may be responsible for two degrees of rise in temperature of said element 1. Thus the temperature of the thermostatic element 1 may be raised in the order of twenty degrees and caused to reopen, assuming that the element 1 has an operating differential of twenty degrees. Thus a variable temperature difference is created between the thermostatic element 1 and the surrounding region, whereby the temperature of the thermostatic element 1 is raised eighteen degrees while the temperature of the surrounding region is raised two degrees.

The variable resistance 21 is used to adjust the degree of heating of the lamp 19, thereby varying the operating temperature differential of the surrounding region. From the above, it will be seen that there is provided means for causing a thermostatic element of inherently wide operating differential, to control the temperature of a region requiring a relatively narrow and variable temperature differential between said hot and cold conditions and hence this modification provides for varying the upper temperature of the temperature differential, thereby varying the temperature differential.

It will be understood that it is not absolutely necessary that the heat of convection of the lamp 19 be used, for it may be designed to provide enough radiating heat so that if placed opposite the element 1, said advantages will accrue. Also the lamp 19 may be arranged to heat the element 1 by conduction.

Referring now more particularly to Fig. 2, there is shown a modification which is adopted to vary the temperature range. In Fig. 2 like numerals indicate like parts corresponding to like parts in Fig. 1. It will be noted that a circuit 25 is merely connected across the transformer 11 in Fig. 2, rather than across the transformer 11 and the element 1, as is connected the circuit 17 in Fig.

1. Thus the lamp 19 is burning all of the time and is no longer used as a signal.

In order to shift the controlled temperature of operation of the room, a vane 27 is used which controls the heat (conductive and/or radiant) flowing to the element 1, thereby controlling the flow of heat from the lamp 19 to the element 1 and thereby adjusting the room temperature. In this way, the temperature difference between the element 1 and the surrounding region is varied, and thus the otherwise inherently constant temperature differential (taken as a whole) of the element 1 is shifted up or down according to the amount of heat directed to the element 1. In short the deflector vane 27 causes the heat of the room to assume larger or smaller fractions of the function of heating of the thermostatic element 1, depending upon whether or not the deflector 27 is set to deflect more or less heat away from said element 1. Thus the upper and lower temperatures, of the controlled temperature differential, may be varied with respect to a predetermined temperature.

The operation of the form shown in Fig. 2 corresponds with the operation described in connection with Fig. 1 in so far as the operation of the relay 13 is concerned. The relay closes to start the heater H in circuit 15 when the element 1 closes the circuit 9. When the element opens, the relay opens and the heater shuts off.

Referring now more particularly to Fig. 3, there is shown a modification in which the reduction of temperature differential of Fig. 1 is combined with the variable range of temperature effected by the Fig. 2 modification. In Fig. 3 like numerals designate like parts as of Figs. 1 and 2. The light 19 in Fig. 3, as in Fig. 1, is connected across the transformer 11 and the element 1, this being done by means of a circuit 17 corresponding to said circuit 17 in Fig. 1. There is also shown in Fig. 3 a variable resistance 21 which may be factory set and varied only by disassembling the structure. Connected across the transformer 11 and the relay 15 is a circuit 29 including a heating resistance 31 to be used in conjunction with the lamp 19, and including a suitable compensating resistance 33. The deflector 27 is also used. The deflector 27 operates in the same way that the deflector 27 of Fig. 2 operates, except that it controls the heat both from the lamp 19 and the auxiliary resistance 31. It will be seen that in Fig. 3 the circuit 17 of lamp 19 is similar to that shown in Fig. 1 and hence the lamp may again be used as a means for reducing or narrowing the temperature differential in the region being heated, below that required to operate the thermostatic element 1. Thus the lamp 19 burns brightly only when the heater is on, that is, when the thermostatic element 1 is in closed circuit position, because then it receives current directly from the transformer 11. When the element 1 opens the circuit 9, then the lamp 19 receives current by way of the resistances 31, 33 and hence burns dimly. The lamp 19 may thus be used as a signal and also as a means for reducing the operating differential temperature of the room, analogously to the manner in which the lamp 19 in Fig. 1 is used.

Thus, the lamp 19 is adapted to vary the upper temperature of the temperature differential which is to be maintained in the surrounding region.

The heater 31 plus the dimly burning lamp 19 cooperate to heat the element 1 and thereby predetermine the lower temperature of the temperature differential which is to be controlled in the surrounding region. It is to be noted that the heater 31 and the dimly burning lamp 19 correspond to the lamp 19 of the modification shown in Fig. 2. In other words, the upper temperature of the temperature differential of the surrounding region is variable, and the lower temperature is variable, and the two temperatures are variable independently of each other. In the Fig. 2 modification, the two room temperatures are variable, but not independently of each other, and are always a fixed number of units apart depending upon the predetermined operating temperature differential of the element 1. In the Fig. 1 modification, only the upper temperature of the temperature differential to be controlled is variable.

The vane 27 is also included in the Fig. 3 modification, and serves the same purpose as in the Fig. 2 modification that is to control the heat supplied to the element 1 from the heater 31 and the dimly or brightly burning lamp 19. This form of the invention effects reduction in the operable room temperature differential and provides room temperature adjustment means.

In Fig. 4 there is shown a modification similar to the Fig. 3 modification, but having greater flexibility of adjustment of the upper as well as the lower temperature of the temperature differential to be controlled in the surrounding region. The element 1 is provided with double contacts, one in the circuit 9 and one in a shunt circuit 35. The shunt 35 includes a variable resistance 37 and a heating resistance 39.

In this modification the heating capacity of the lamp 19 is similar to that of the Fig. 1 modification and controls the upper temperature of the temperature differential to be controlled in the surrounding region.

The heating capacity of the heater 39 is sufficient to maintain the correct temperature difference between the lower temperatures of the temperature differential of the element 1, and the surrounding region, and thus is adapted to govern the lower temperature of the temperature differential to be controlled.

The resistance 39 is connected across the transformer 11 and is adapted to supply less heat than the lamp 19. The lamp 19 is connected across the transformer 11 and element 1 by circuit 41 and can be used as a signal inasmuch as it lights and goes out as the element 1 travels to and from closing position of circuit 9 (see contacts 43). On the other hand, the resistance 39 is alternatively thrown into and out of circuit so that either it or the lamp 19 is in operation (see contacts 43 and 45).

It is thus seen that a more independent control is had over the upper and lower temperatures of the temperature differential of the surrounding region in that a variation in the temperature in the heat supplied by the lamp 19 while it is burning brightly does not affect the heat supplied by the heater 39 which governs the lower temperature since the lamp 19 is off while the heater 39 is on.

Figure 5:
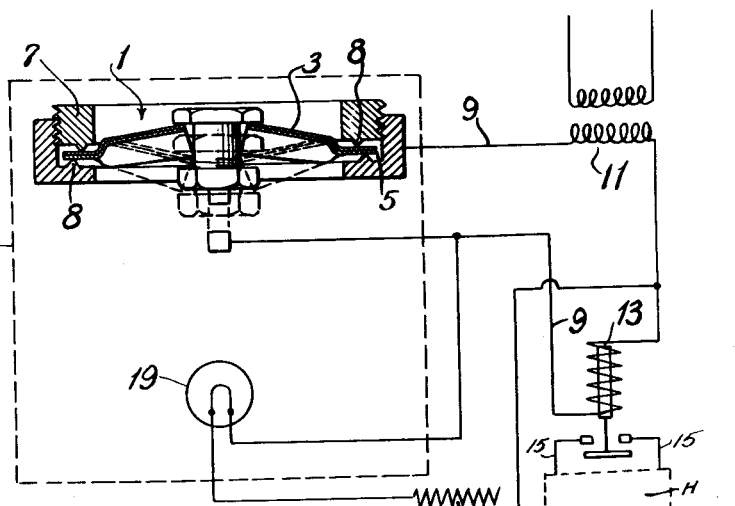
Fig. 5 is a diagram showing a fifth form.

Referring now more particularly to Fig. 5, which has circuits 9 and 17 similar to Fig. 1, the light 19 is positioned to heat the element 1 by radiation. This modification is of advantage when the thermostat is not covered and is used in a drafty location, the transfer of heat by radiation being unaffected by the flow of air. It is to be understood that the Fig. 5 modification may be used in any of the other modifications.

Referring now more particularly to Figs. 6 and 7, there is shown a mechanism 43 for automatically maintaining a room temperature during certain hours which is lower than that which is maintained during the remainder of the day. As hereinbefore described, the heaters 31 or 39, and in the Fig. 2 modification the lamp 19, control the lower room temperature of the temperature differential maintained in the room by the thermostatic system. If the amount of heat supplied to the element 1 by the heaters, is raised the said lower temperature is lowered in proportion to the increase in the heat supplied. Inasmuch as the vane 27 is a means for controlling the flow of heat from the heaters to the element 1, by automatically adjusting the vane 27, it is possible to automatically control the lower room temperature.

The mechanism 43 is adapted to operate a vane 27, shown in the modifications of Figs. 2 to 4, to control the amount of heat flowing from the lamp 19 and/or the heaters 31 or 39 to the element 1.

The mechanism 43 comprises a set of cams 45 mounted on a shaft 47 which is frictionally driven by a gear 49 which in turn is driven by an hour hand shaft of a clock mechanism 53 through a two to one reduction gear 51. Thus the cams 45 rotate once every twenty-four hours. The cams 45 are adjustable on the shaft 47 to effect a shorter or longer period of contact with the vane 27, as shown in Figs. 6 and 7.

A knob 55 is mounted on the shaft 47 for setting the cams 45 to contact with the vane 27 at a predetermined time.

Thus the control mechanism 43 is adapted to automatically set the vane 27 at predetermined times and for predetermined periods of time. In this way the room temperature is also automatically controlled during the periods of time of the contact of the cams 45 with the vane 27.

It is to be understood that the invention is in no way limited to snap-acting thermostats, nor to the particular circuits shown.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawings shall be interpreted as illustrative and not in a limiting sense.

We claim:

1. In a thermostatic control, a thermostatic element, a circuit, means for energizing said circuit, a main heater controlled by said circuit and adapted to heat a region through temperatures adapted to be controlled by said element, contacts in said circuit operable by said element, an auxiliary heater juxtaposed with respect to said element adapted to heat the same by convection, said contacts being operable by said element to deenergize said circuit and to vary the degree of heating of said auxiliary heater over a maximum and minimum, said auxiliary heater comprising a lamp which is never completely deenergized and a third heater juxtaposed with respect to said lamp and the element.

2. In a thermostatic control, a thermostatic element, a circuit, means for energizing said circuit, a main heater controlled by said circuit and adapted to heat the region through temperatures adapted to be controlled by said element, contacts in said circuit operable by said element, an auxiliary heater juxtaposed with respect to said element adapted to heat the same by convection, said contacts being operable by said element to deenergize said circuit and to control the degree of heating of said auxiliary heater, said auxiliary heater comprising a lamp which is never entirely deenergized and a third heater juxtaposed with respect to said lamp and the element, and means comprising a vane for adjusting the flow of heat from the lamp and third heater to the element.

3. A thermostatic control comprising a thermostatic element, a circuit, a set of contacts in said circuit operable by said element, a main heater controlled by said circuit and adapted to heat a region surrounding said element, an auxiliary heater juxtaposed with respect to said element and energized from said circuit, a third heater also juxtaposed with respect to said element, a second circuit for energizing said third heater, a second set of contacts operable by said element in said second circuit, said heaters being arranged in respect to said element in a heat-exchanging relationship, whereby the degree of heating by the main heater may be controlled by the degree of heating by the auxiliary heater, and the third heater.

4. A thermostatic control comprising a thermostatic element, a circuit, a set of contacts in said circuit operable by said element, a main heater controlled by said circuit and adapted to heat a region surrounding said element, an auxiliary heater juxtaposed with respect to said element and energized from said circuit, a third heater also juxtaposed with respect to said element, a second circuit for energizing said third heater, a second set of contacts operable by said element in said second circuit, said heaters being arranged, in respect to said element, in a heat-exchanging relationship, whereby the degree of heating by the main heater may be controlled by the degree of heating by the auxiliary heater, and the third main heater, and means in said second-named circuit for controlling the heating of said third heater.

5. A thermostatic control comprising a thermostatic element, a circuit, a set of contacts in said circuit operable by said element, a main heater controlled by said circuit and adapted to heat a region surrounding said element, an auxiliary heater juxtaposed with respect to said element and energized from said circuit, a third heater also juxtaposed with respect to said element, a second circuit for energizing said heater, a second set of contacts operable by said element in said second circuit, said auxiliary heater being energized when said first-named circuit is closed, and said third heater being energized when said second circuit is closed whereby the temperature of the region may be controlled by the degree of heating by the auxiliary heater, and the third main heater, and means in said second-named circuit for controlling the heating of said third heater, and means interposed between said element and auxiliary and third-named heating means for controlling the flow of heat from said heaters to said element.

6. A thermostatic control comprising a thermostatic element, a circuit, a set of contacts operable by said element, a main heater controlled by said circuit and adapted to heat a region surrounding said element, an auxiliary heater juxtaposed with respect to said element and energized from said circuit, a third heater also juxtaposed with respect to said element, a second circuit for energizing said heater, a second set of contacts operable by said element in said second circuit, said heaters being arranged in respect to said element in a heat-exchanging relationship, whereby the operating temperature differential range of said region may be varied below the inherent temperature differential range of said element and whereby an operating temperature differential range of the region surrounding said element is obtained which is more narrow than the inherent operating temperature differential range of the thermostatic element.

7. In a thermostatic control, a thermostatic element, a circuit, means for energizing said circuit, a main heater controlled by said circuit and adapted to heat a region through temperatures adapted to be controlled by said element, contacts in said circuit operable by said element, an auxiliary heater juxtaposed with respect to said element adapted to heat the same by radiation, said contacts being operable by said element to deenergize said circuit and to vary the degree of heating of said auxiliary heater over a maximum and minimum, said auxiliary heater comprising a lamp which is never completely deenergized and a third heater juxtaposed with respect to said lamp and the element.

8. A thermostatic control comprising a thermostatic element having an inherently constant operating temperature differential, and mounted in a surrounding region having a temperature differential to be controlled by said thermostatic control, means connected with said thermostatic element for varying the upper temperature of said temperature differential of said surrounding region which will cause said thermostatic element to operate and means for varying the lower temperature of said temperature differential of said surrounding region, which shall cause said thermostatic element to operate, whereby the controlled temperature differential of said surrounding region may be narrowed and widened and varied over a range.

9. A thermostatic control comprising a thermostatic element, a main heater for heating the region, the temperature of which is to be controlled by said element, said main heater being controlled by said element, an auxiliary heater in heat conductive relationship with respect to said element and means for continuously varying the flow of heat between said auxiliary heater and said element, and a time control means, said means being adapted to operate said means for varying the flow of heat, whereby said continuous variation means may be automatically adjusted during predetermined time intervals.

10. A thermostatic control comprising a thermostatic element, a main heater for heating the region the temperature of which is to be controlled by said element, said main heater being controlled by said element, an auxiliary heater in heat conductive relationship with respect to said element and means for continuously varying the flow of heat between said auxiliary heater and said element, and a time control means, said time control means being adapted to automatically operate said means for varying the flow of heat at predetermined instants and for a predetermined period of time.

11. A thermostatic control comprising a thermostatic element, a main heater controlled by said element and adapted to heat a region, the temperature of which is to be controlled by said element, an auxiliary heater in heat conductive relationship with respect to said element, means for adjustably controlling the flow of heat between said auxiliary heater and said element comprising an adjustable vane, and a time-control means adapted to adjust said vane at predetermined instants, and for predetermined time intervals.

12. A thermostatic control as in claim 8, in which both of said means comprise electrically energized resistance elements.

13. A thermostatic control as in claim 8, in which both of said means comprise heating elements in heat conductive relationship to said thermostatic element.

14. A thermostatic control as in claim 8, in which both of said means comprise electrical resistance elements, and in which a circuit-controlling means is associated with said thermostatic element, said circuit-controlling means being adapted to energize and deenergize said resistance elements according to the relative position of said thermostatic element.

In testimony whereof, we have signed our names to this specification this 6th day of April, 1931.

JOHN A. SPENCER.
VANNEVAR BUSH.